US010846772B2

(12) United States Patent
Mowatt et al.

(10) Patent No.: US 10,846,772 B2
(45) Date of Patent: Nov. 24, 2020

(54) ITEM MAPS FOR APP STORE APPS

(71) Applicant: Microsoft Corporation, Redmond, WA (US)

(72) Inventors: David Mowatt, Dublin (IE); Kurt Berglund, Seattle, WA (US); Aravind Bala, Redmond, WA (US); David Ahs, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 14/455,833

(22) Filed: Aug. 8, 2014

(65) Prior Publication Data

US 2016/0042426 A1 Feb. 11, 2016

(51) Int. Cl.
*G06Q 30/00* (2012.01)
*G06Q 30/06* (2012.01)
*G06Q 10/00* (2012.01)

(52) U.S. Cl.
CPC ......... *G06Q 30/0625* (2013.01); *G06Q 10/00* (2013.01); *G06Q 30/00* (2013.01);
(Continued)

(58) Field of Classification Search
CPC ......... G06F 17/30017; G06F 17/30867; G06F 17/3089; G06Q 30/06; G06Q 30/0255;
(Continued)

(56) References Cited

U.S. PATENT DOCUMENTS 8,413,052 B2   4/2013 Roy et al.
8,725,124 B2   5/2014 Toy et al.
(Continued)

FOREIGN PATENT DOCUMENTS

CN   101859425 A   10/2010
CN   102158593 A   8/2011
(Continued)

OTHER PUBLICATIONS

Method for Interapp Communication Between Apps Across Mobile Devices. An Ip.com Prior Art Database Technical Disclosure. Authors et. al.: Disclosed Anonymously. Ip.com No. IPCOM000220428D. Ip.com Electronic Publication Date: Jul. 27, 2012 (Year: 2012).*
(Continued)

*Primary Examiner* — Anand R Loharikar
(74) *Attorney, Agent, or Firm* — Liang IP, PLLC

(57) ABSTRACT

An app in an app store may be associated with a statically or dynamically generated list of the app's features, modes, content, and/or target device. Different descriptions, icons, titles, and the like may be shown in the app store for each of those features, modes, and content. Based on the mapping and display of individual options, users may be enabled to purchase just one of those modes, features, and/or content. If a user finds one of the provided options and acts to acquire it, the app may start up in a mode tailored to the options (feature, mode, content) rather than activating in a generic way. App stores may limit a number of options per app that can appear in search results, to prevent result spamming by collapsing displayed results, limiting the actual number of displayed results, or filtering by user.

20 Claims, 10 Drawing Sheets

(52) U.S. Cl.
CPC ..... *G06Q 30/0601* (2013.01); *G06Q 30/0621* (2013.01); *G06Q 30/0627* (2013.01)

(58) Field of Classification Search
CPC .......... G06Q 20/0209; G06Q 30/0625; G06Q 10/00; G06Q 30/00; G06Q 30/0601; G06Q 30/0621; G06Q 30/0627; H04W 4/003; Y10S 707/948
See application file for complete search history.

(56) References Cited

U.S. PATENT DOCUMENTS

| | | | |
|---|---|---|---|
| 2003/0195891 A1* | 10/2003 | Marsh | H04N 7/165 |
| 2006/0188860 A1* | 8/2006 | Morrison | G09B 7/00 434/322 |
| 2009/0150545 A1 | 6/2009 | Flores et al. | |
| 2011/0208631 A1 | 8/2011 | Glick et al. | |
| 2011/0320426 A1 | 12/2011 | Dutta et al. | |
| 2012/0131470 A1 | 5/2012 | Wessling et al. | |
| 2012/0233235 A1 | 9/2012 | Allaire et al. | |
| 2012/0290583 A1 | 11/2012 | Mahaniok et al. | |
| 2012/0303491 A1* | 11/2012 | Hill | G06Q 30/06 705/27.2 |
| 2012/0330786 A1* | 12/2012 | Paleja | G06Q 30/02 705/26.41 |
| 2013/0124186 A1* | 5/2013 | Donabedian | G06F 17/289 704/2 |
| 2013/0212160 A1 | 8/2013 | Lawson et al. | |
| 2013/0231093 A1* | 9/2013 | Toy | H04W 4/00 455/414.1 |
| 2013/0268397 A1 | 10/2013 | Mehta et al. | |
| 2013/0318514 A1 | 11/2013 | Neeman | |
| 2014/0164520 A1 | 6/2014 | Fan | |
| 2015/0039580 A1* | 2/2015 | Subhedar | G06F 17/30864 707/706 |
| 2015/0312271 A1* | 10/2015 | Glover | H04L 63/1441 726/23 |

FOREIGN PATENT DOCUMENTS

| | | |
|---|---|---|
| CN | 102681841 A | 9/2012 |
| CN | 102693155 A | 9/2012 |
| CN | 103907104 A | 7/2014 |
| CN | 103959249 A | 7/2014 |
| JP | 2010218559 A | 9/2010 |
| JP | 2012069002 A | 4/2012 |
| JP | 2016508254 A | 3/2016 |
| RU | 2523957 C2 | 7/2014 |
| WO | 2014036023 A2 | 3/2014 |

OTHER PUBLICATIONS

"International Search Report & Written Opinion Issued in PCT Application No. PCT/US2015/043896", dated Oct. 2, 2015, 10 Pages.
"Google Apps Marketplace Developer's Overview", Published on: Apr. 27, 2012 Available at: https://developers.google.com/google-apps/marketplace/.
"International Preliminary Report on Patentability Issued in PCT Application No. PCT/US2015/043896", dated Sep. 22, 2016, 9 Pages.
"Second Written Opinion Issued in PCT Application No. PCT/US2015/043896", dated Jun. 30, 2016, 8 Pages.
"Office Action Issued in European Patent Application No. 15751227.8", dated Nov. 30, 2017, 9 Pages.
"Notice of Allowance Issued in Japanese Patent Application No. 2017-527196", dated Jun. 26, 2019, 5 Pages.
"Office Action Issued in Mexican Patent Application No. MX/a/2017/001817", dated Jul. 16, 2019, 5 Pages.
"Office Action Issued in Russian Patent Application No. 2017103916", dated Feb. 21, 2019, 9 Pages. (W/O English Translation).
"First Office Action and Search Report Issued in Chinese Patent Application No. 201580042699.0", dated Mar. 11, 2020, 11 Pages.
"Office Action Issued in Mexican Patent Application No. Mx/a/2017/001817", dated Mar. 2, 2020, 10 Pages.

* cited by examiner

FIG. 4B

MY APPS | STORE

← BACK

Adding vectors

Computing expressions using trig addition and subtraction identities

This item is part of the following app:

Math Labs
FREE
from Math Academy

SCREENSHOTS | DETAILS | CONTENTS | REVIEWS

This app contains the following 442 items (showing first 25)

Adding vectors
Addition of vectors in two dimensions

Adding trigonometric identities
Computing expressions using trig addition and subtraction identities

Adding vectors
Adding and subtracting two expressions with different denominators, where each is of the form Ax/B or A/Bx.

Adding and subtracting rational

Cancel

ITEM MAPS FOR APP STORE APPS

BACKGROUND

Modern operating systems for a variety of computing devices enable a wide range of functionality through apps. Users are used to downloading and installing apps from app stores managed by operating system providers, device providers, or other sources. App stores allow hundreds of thousands of developers to create apps that solve user problems or address user desires and then make those apps findable by millions of users.

If an app is listed in the store just once, it may allow the developer to keep innovating while needing only to maintain a single code base for their app. However, the app may get one description and one title. This may mean a value proposition for the app may be so generic that the app may be less compelling than a more targeted offering. For example, a form filling app that is attractive for doctors, for realtors, and for surveyors may have to be merchandised generically.

On the other hand, if an app is listed in the store multiple times (e.g., once targeting realtors, once targeting doctors, etc.), the app may be merchandised in a targeted way. The challenge with this approach may be that the developer may need to maintain multiple codebases (e.g., once for the realtor app, once for the quantity surveying app, once for the medical app, etc.) each time they add core features.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to item maps for apps provided through an app store. According to some examples, a method executed on a computing device to provide apps and items associated with apps through an app store is described. The method may include receiving an app—item map providing a statically and/or dynamically generated list of an app and items associated with the app; receiving a search or browse query; and determining one or more apps and one or more items responsive to the query, where the one or more items are determined based on matches against information provided by the app—item map. The method may also include presenting the one or more apps and the one or more items for selection.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 4A through 4D illustrate various user interface examples associated with presenting items from an app store to users, according to embodiments;

DETAILED DESCRIPTION

Figure 1:
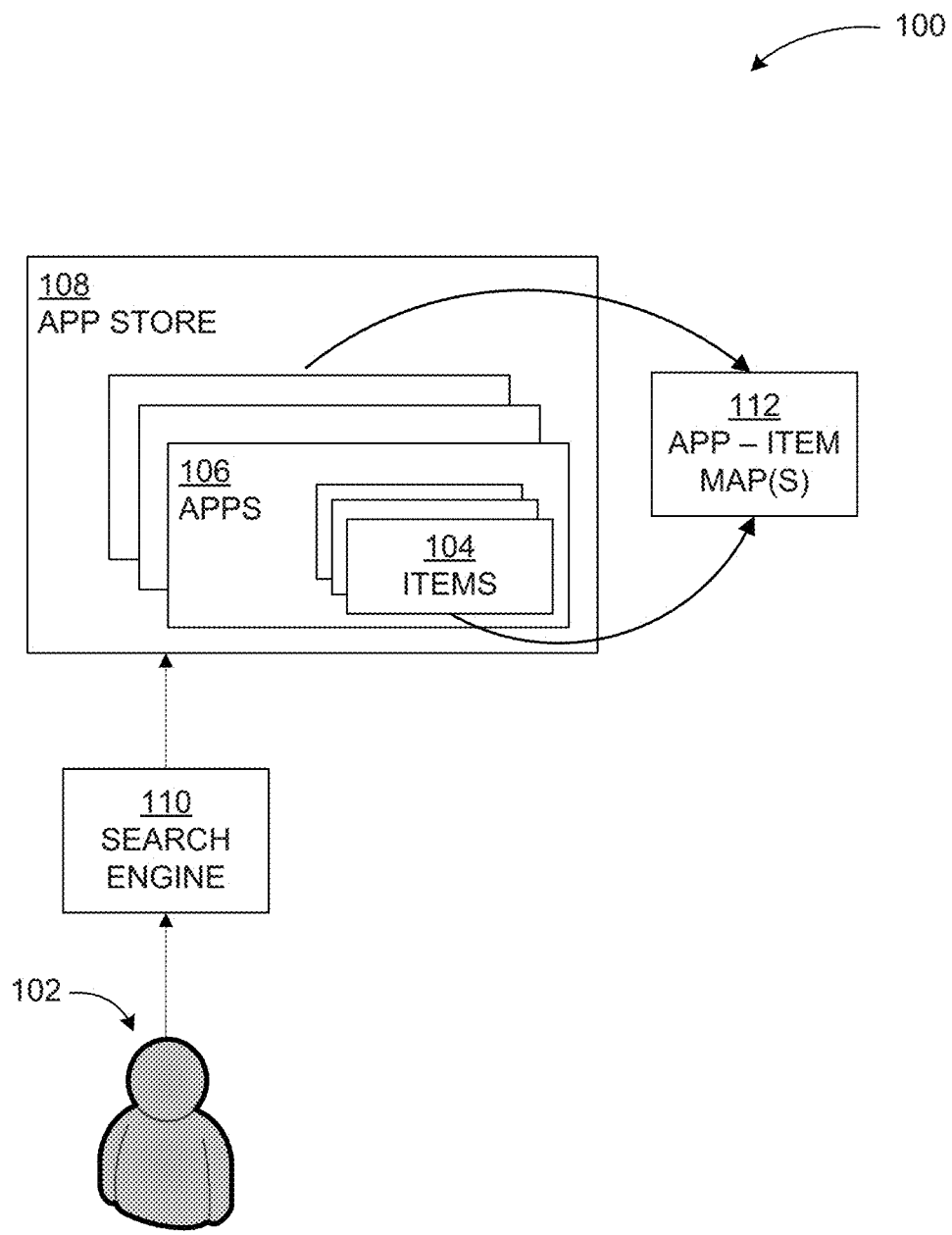
FIG. 1 is a conceptual diagram illustrating an example app store providing apps with items, according to embodiments.

As briefly described above, an app in an app store may be associated with a statically or dynamically generated list of the app's features, modes, content, and/or target devices. Different descriptions, icons, titles, and the like may be shown in the app store for each of those features, modes, and content. Based on the mapping and display of individual options, users may be enabled to purchase just one of those modes, features, and/or content. In some examples, if a user finds one of the provided options and acts to acquire it, the app may start up in a mode tailored to the options (feature, mode, content, and target device) rather than activating in a generic way. In other examples, app stores may limit a number of options per app that can appear in search results, to prevent result spamming. This may be accomplished by collapsing displayed results or limiting the actual number of displayed results. Furthermore, search results of the app store may be sorted based on user provided information, usage history, credentials, and apps may be selected and/or started based on the same.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide option mapping for apps in an app store. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example app store providing apps with items, according to embodiments.

In diagram 100, an app store 108 may provide a variety of apps for various devices including, but not limited to, desktop computers, smart phones, tablet devices, wearable devices, and so on. The app store 108 may be a cloud based service. A user 102 searching for app among the potentially hundreds of thousands or millions of apps may provide search criteria to a search engine 110. The search engine 110 may be an independent search engine or part of the app store 108.

Some of the apps 106 (among the large number of available ones) may include potentially a large number of items 104 (e.g., content, features, modes, target devices, etc.). Thus, there may be many configurations for each application making it challenging for app developers/owners to create a single description that matches all user queries well and thus that returns at the top of search results for a broad range of queries. For example, if each app configuration is listed separately, maintaining the different configurations may be difficult for the developers. If the app is listed once, however, targeted marketing opportunities may be lost.

According to some embodiments, different descriptions, icons, titles, and the like may be shown in the app store for each of those features, modes, content, and devices. Based on the mapping of individual options through app-item map(s) 112, a user 102 may be enabled to purchase just one of those modes, features, content, and/or devices. In some examples, if a user finds one of the provided options and acts to acquire it, the app may start up in a mode tailored to the options (feature, mode, content, and/or devices) rather than activating in a generic way.

While the example system in FIG. 1 has been described with specific components, embodiments are not limited to these components or system configurations and can be implemented with other system configuration employing fewer or additional components.

Figure 2:
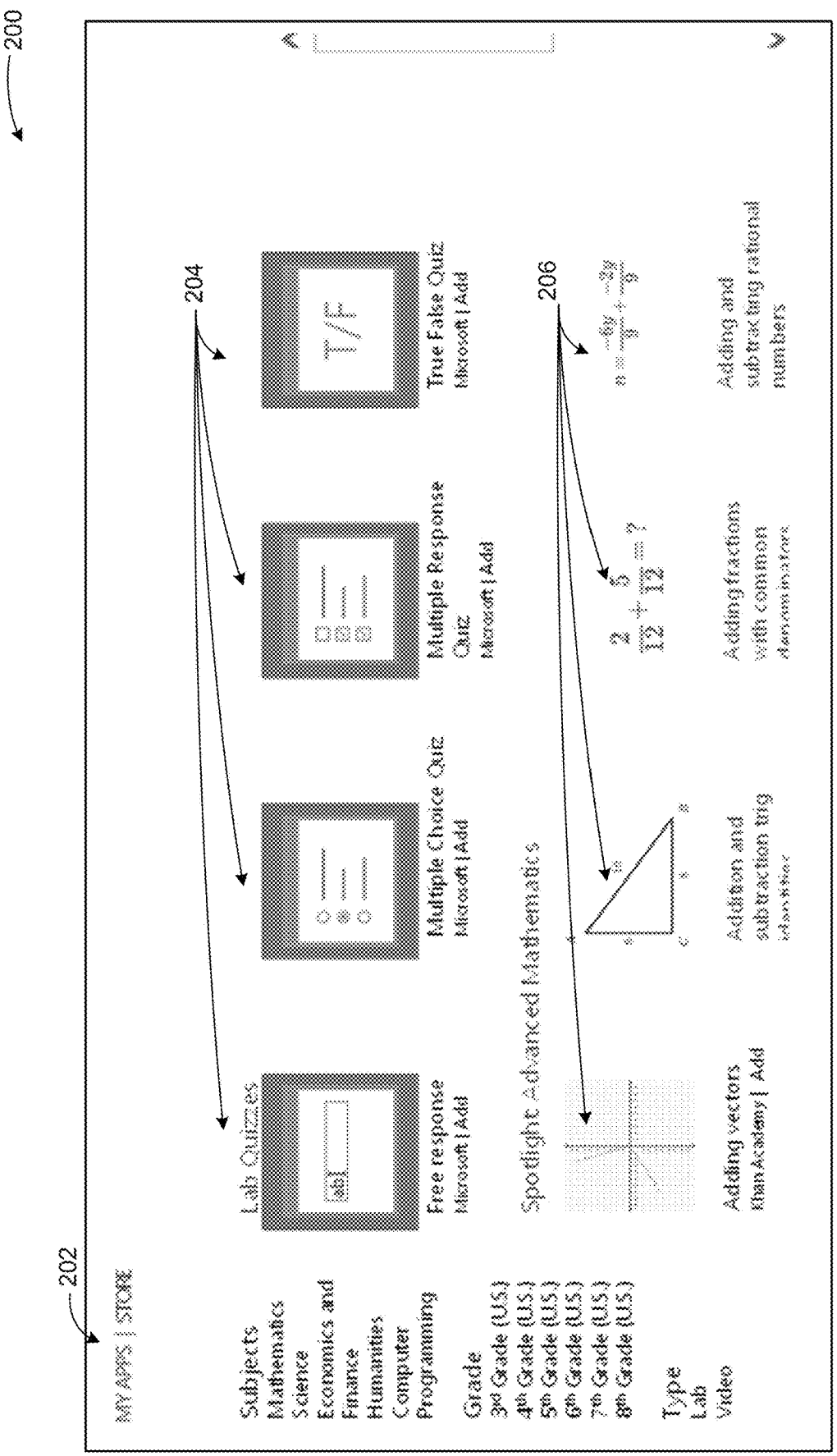
FIG. 2 illustrates an example app store user interface displaying available apps and items at the same time, according to embodiments.

FIG. 2 illustrates an example app store user interface displaying available apps and items at the same time, according to embodiments.

In a store app configuration according to some embodiments, various items associated with individual apps may be presented (in a searchable fashion) along with the apps. Thus, targeted marketing may be enabled while reducing a burden of upkeep by developers through the use of an app-item map (also referred to as "app map"). The example user interface 202 in diagram 200 shows a list of apps 204 that may be displayed as a result of a search for mathematics teaching tools and a list of items 206 that are part of a specific app, but geared to specific aspects (e.g., addition of vectors, addition of fractions, etc.). Diagram 200 shows one particular app that contains 100s of items relating to the teaching of mathematics. In one scenario, the user may click on the trigonometry item. Thus, a user may select and install/activate a specific item as opposed to the entire app with all items.

When a developer submits an app to an app store, they typically provide an app package, an app title, an app icon, an app price, and the app's screenshots, descriptions, keywords, etc. In a system according to embodiments, the developer may also submit an app map along with the above information. Depending on the app's functionality and the developer's goals, an item identifier, a title, an item icon, a rank, an item price, what the item applies to, an audience or device targeting information, along with description, keywords, etc. may be submitted for each item associated with an app. Thus, the app map may include two or more sets of the above information. When the app is added to the app store's main catalog (and thus indexed by its search engine), not only may the individual apps 204 get added to the catalog, but the app items 206 may get added also.

In an example scenario, there may be five apps in the store, each with rich descriptions: App ID 11 "My form filler", App ID 12 "Insulin record forms", App ID 13 "Insulation checklist", App ID 14 "Construction guide", App ID 15 "Global form filling". The Global Form Filling app may leverage the app map and may have two items in its map (for simplicity, just the item ID+title are used herein, though each may have rich descriptions too): Item 1 "Medical form filling" and Item 2 "Quantity Surveyor's on-site survey". As a result, if an app store user searches for 'medical form', they may see a search results page containing the following: Medical form filling [App ID 15/Item 1]; Insulin record forms [App ID 12]; My Form Filler [App ID 11]. The user may be more likely to select the Global Form Filling app because the title and description are better suited to the user's query and underlying intent.

Figure 3:
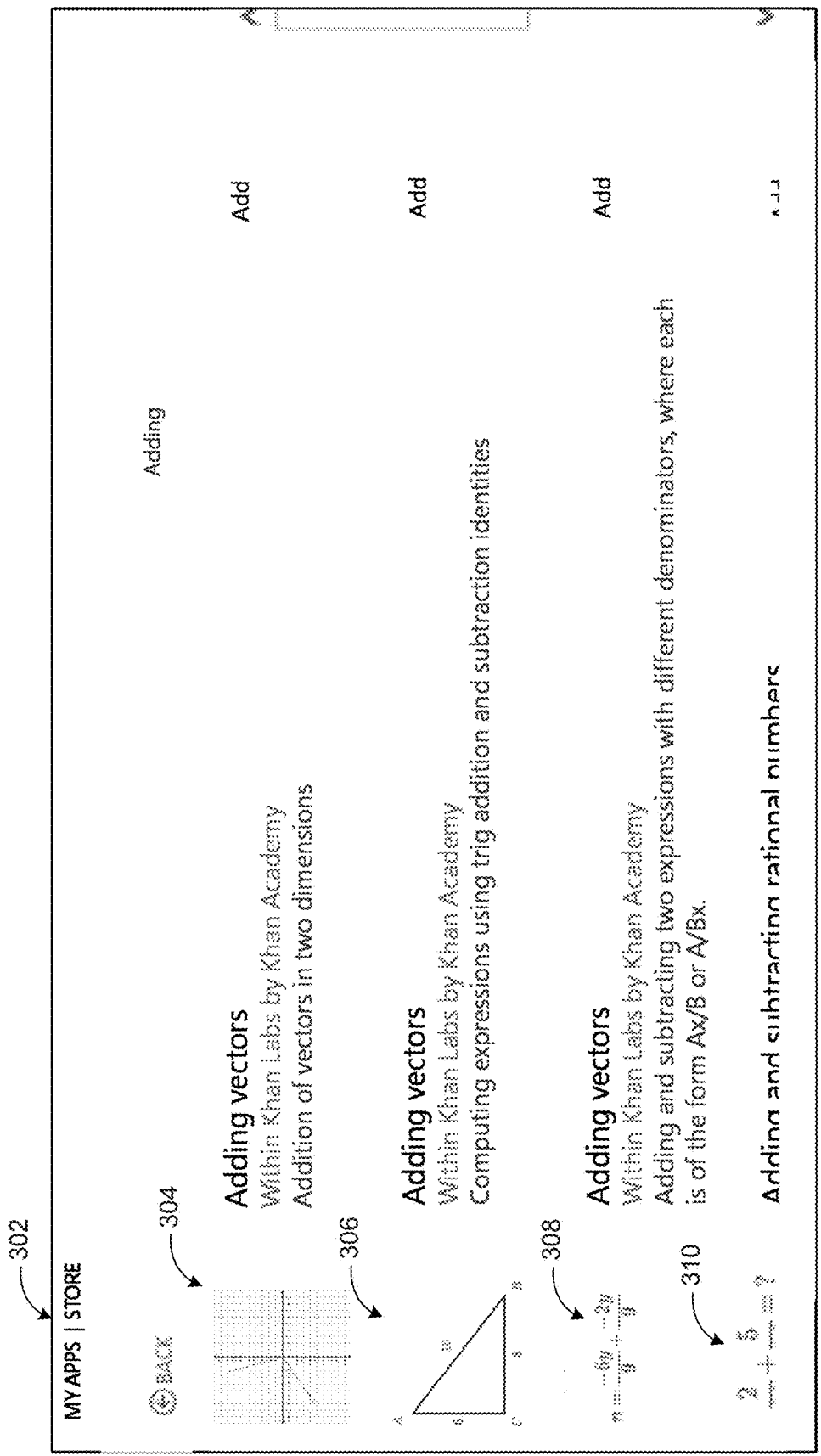
FIG. 3 illustrates another example app store user interface displaying available items (e.g., in response to a search) and information associated with those items, according to embodiments.

FIG. 3 illustrates another example app store user interface displaying available items (e.g., in response to a search) and information associated with those items, according to embodiments.

Diagram 300 shows an app store user interface 302 displaying four items 304, 306, 308, and 310 associated with a mathematics teaching app. Each item is represented by an icon and a brief description providing insight into the item's functionality allowing users to decide which item is more suitable to their needs.

In some example embodiments, the app map may be submitted as a structured data file (e.g., an XML file) in the app store developer's portal. In another example embodiment, the app map may not be submitted to the app store, but instead it may be hosted on the developer's site and a link to the developer's app map web service location may be submitted to the developer portal instead. In the latter scenario, when the user searches for 'medical form', the app store may return a set of apps in its catalog. The app store may then check within the returned result set to see if any of the apps contain app maps, and if they do, attempt to call those apps' web service dynamically to retrieve more relevant descriptions for the user's query. A "query" as used herein is not limited to search queries, but may also be used for browse queries.

In yet another example embodiment, the app map may be derived automatically from the capabilities of the app, either as described in the in-app purchasable entities, or by processing a single description that the developer submits to be converted into multiple descriptions. When the user sees an entry in the search results they may be interested in (e.g., the Medical form filling result), they may click through to read more. At this point, the item's metadata may be presented to the user (e.g., medical-specific descriptions). The user may or may not be presented with information about the parent app (Global Form Filling). For example "Buy the medical form filling app and get access to all other form/survey capabilities of Global Form Filling". In other examples, the user may be unaware that there is an underlying app at all.

When the user acquires the app, a number of licensing options may be available (configurable by the developer, the user, and/or the app store business owner). Licensing may be set at the app level, while each item may also have its own price. Licensing may also be set at group of items level or item level as well. For example, the user may buy a license to use the app item only (e.g., just medical form filling), and may also be presented with a way in-app to buy the other items. In another example, the user may buy a license to use all modes/content/items in the app (e.g., all form filling). In this scenario, there may be a single total price for all items in the app, the price may be the sum of each item's price, or there may be a discounted price in between the two examples. The user's license itself may accordingly either record that the app has been bought (i.e. user X is entitled to app Y) or that the item has been bought (user X is entitled to item Z in app Y).

FIG. 4A through 4D illustrate various user interface examples associated with presenting items from an app store to users, according to embodiments.

Figure 4A:
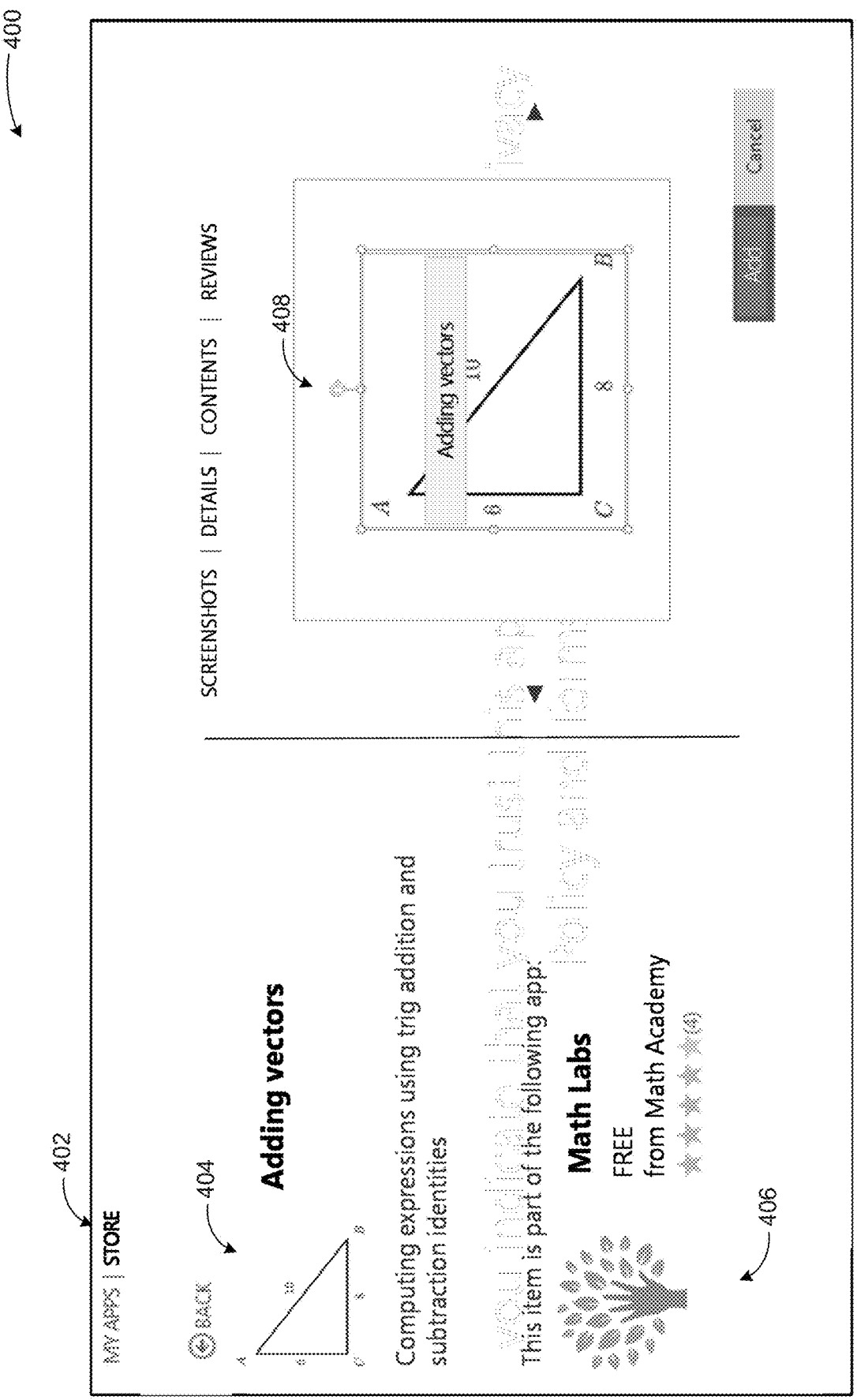

Diagram 400 of FIG. 4A shows a selection screen of an app store user interface 402 that presents a selected item 404, information associated with the parent app 406 of the item 404, as well as more detailed information 408 (in graphic form). There are also options for additional screenshots, details, contents, and reviews of the item. A user may acquire the item by clicking on the "Add" button.

According to some embodiments, the app may launch in a customized way to give the user a tailored experience upon the user acquiring the app. For example, upon a doctor acquiring the form filling app (or the medical form filling item of the form filling app), the app/item may launch with the medical form filling specifics suitable to the doctor's needs.

This may be accomplished by the app store or its licensing system initially activating the app by passing the item identifier as a parameter. This setting may be saved by the app itself, or by the app store/licensing entity so that this mode becomes the user's default experience. The app may then use this item identifier to tailor the interface or the default selected content/filters when the app is executed. Using the same approach, a binary app may be enabled to have basic/premium/ultimate modes, each of which may be a separately merchandised item, for example. If the user has feedback, reviews may be written either at the app level, group of items level, or the item level. If the items have separate prices, the item level may be chosen by default. If not, all reviews may be written about the entire app.

Diagram 410 of FIG. 4B shows the app store user interface 402 displaying along with the selected item 404 information 412 about available items associated with the parent app of the selected item 404 and a number of the other items 414 ranked according to a search algorithm.

In some examples, an internal merchandising team may perform a similar rank-specification function for new apps and/or items. Alternatively, if the app has been in the marketplace for some time, click-through data may be leveraged to influence which subset of all items are surfaced. An app developer may be enabled to specify certain audience-targeting that may guide the app store to select one description over another. For example, if a user is known to be using an education SKU of the platform, or (separately) if a user is known to have acquired a lot of games or a lot of photo apps, a different item may be chosen to be shown to that user. Further, if a developer wishes to test a description, they may list two items with alternate emphases. They may specify that these two items should never be shown together to the same user. Analytics about performance of items (e.g., page views, clicks) may be sent back to the developer for feedback purposes.

Figure 4C:
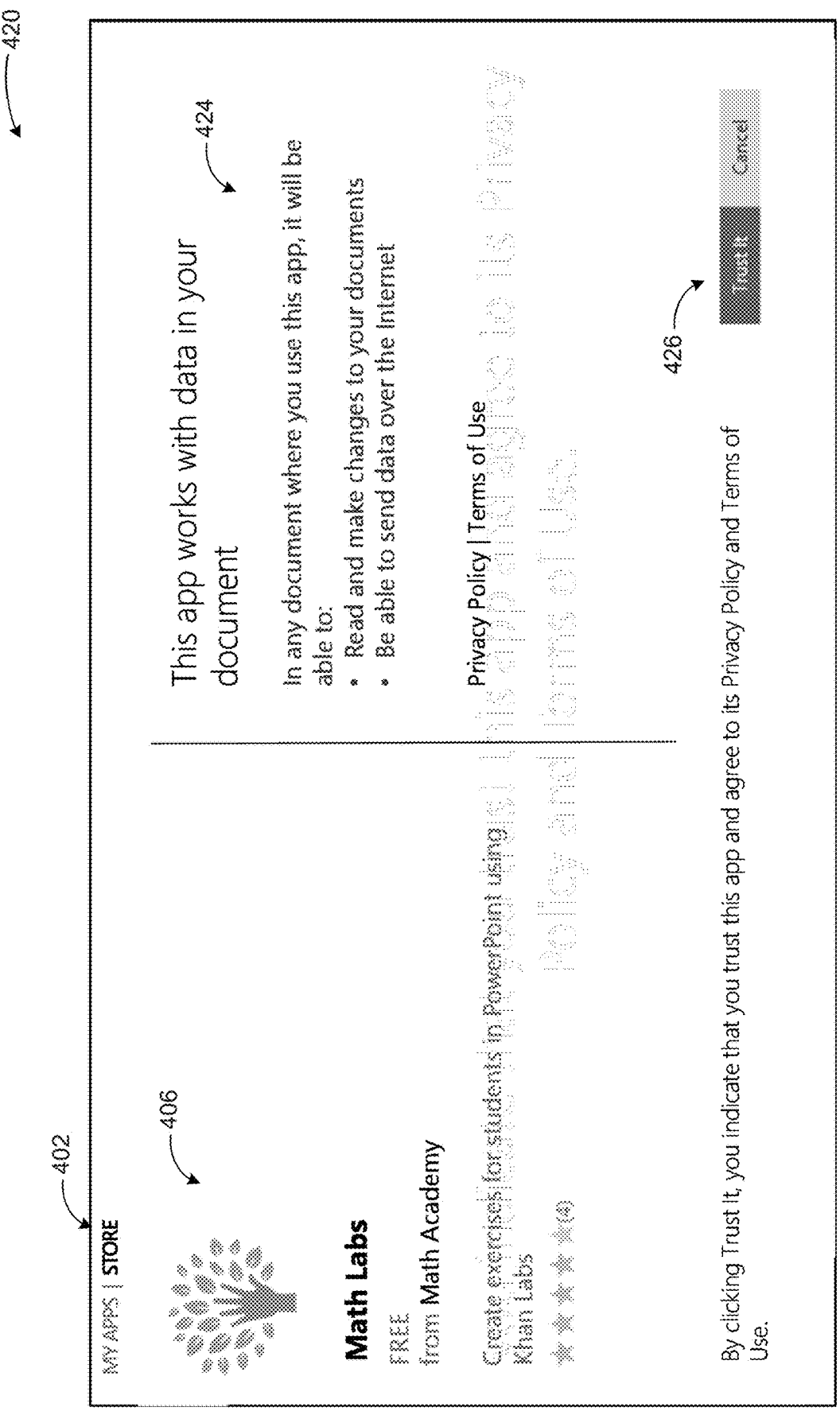

Diagram 420 of FIG. 4C shows the app store user interface 402 displaying an app 406 and statement 424 informing the user that the app works with data in their document if they select "Trust" 426. Thus, an app or its items may be launched in a customized fashion for each user providing a tailored experience.

As a result of the various embodiments described herein, a developer may be enabled to merchandise their apps in multiple targeted ways. The developer may be able to use one binary source app to service multiple different use cases. The developer may also be able to offer a tailored activation experience depending on the item that led the user to find the app.

To prevent spamming by developers, for example, one app flooding an entire first page of search results and pushing all other apps to secondary pages different control mechanisms may be provided in the app store search and browse experience according to some embodiments. Such control mechanisms may include preventing developers from submitting more than a preset limit (e.g., 10) items per app. For a given user's search query, more than a preset limit of items per app (e.g., 3) may be prevented from being shown. Users may also be allowed in context to click on 'see related apps by this provider'. In some examples, the developer may be allowed to specify a per-item relative 'rank' to ensure the developer to be in control of pushing those items which best sell their app.

Figure 4D:
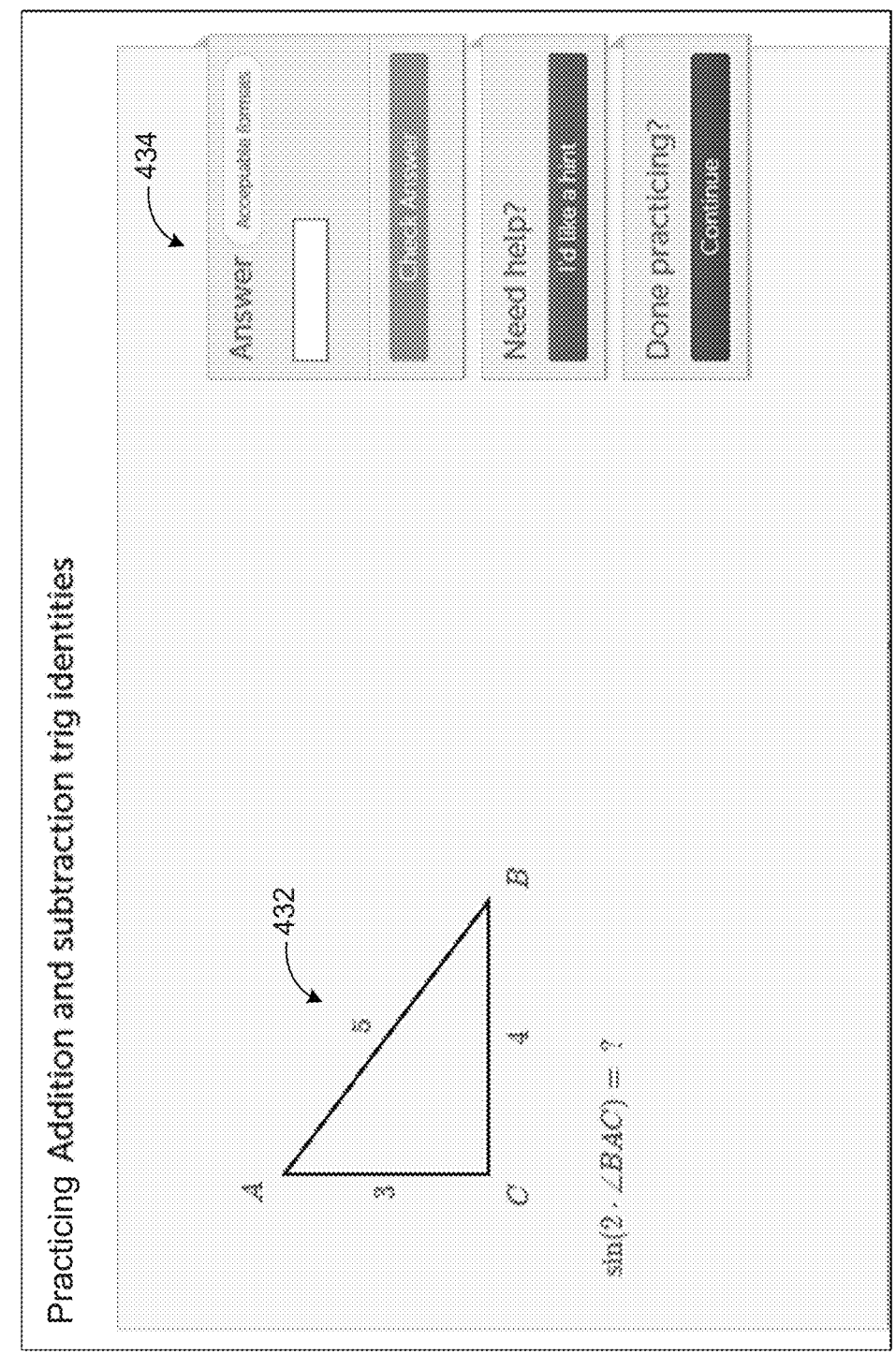

Diagram 430 of FIG. 4D shows a screenshot of a selected item (a mathematics training item) with a graphical test question 432 and options 434 associated with the test question 432 such as answering the question, retrieving help functionality, etc.

The example scenarios and screenshots in FIG. 2 through FIG. 4D are shown with specific components, app types, and configurations. Embodiments are not limited to systems according to these example configurations. Providing an app map for items associated with an app may be implemented in configurations employing fewer or additional components in applications and user interfaces. Furthermore, the example configurations and components shown in FIGS. 2 and 4 and their subcomponents may be implemented in a similar manner with other values using the principles described herein.

Figure 5:
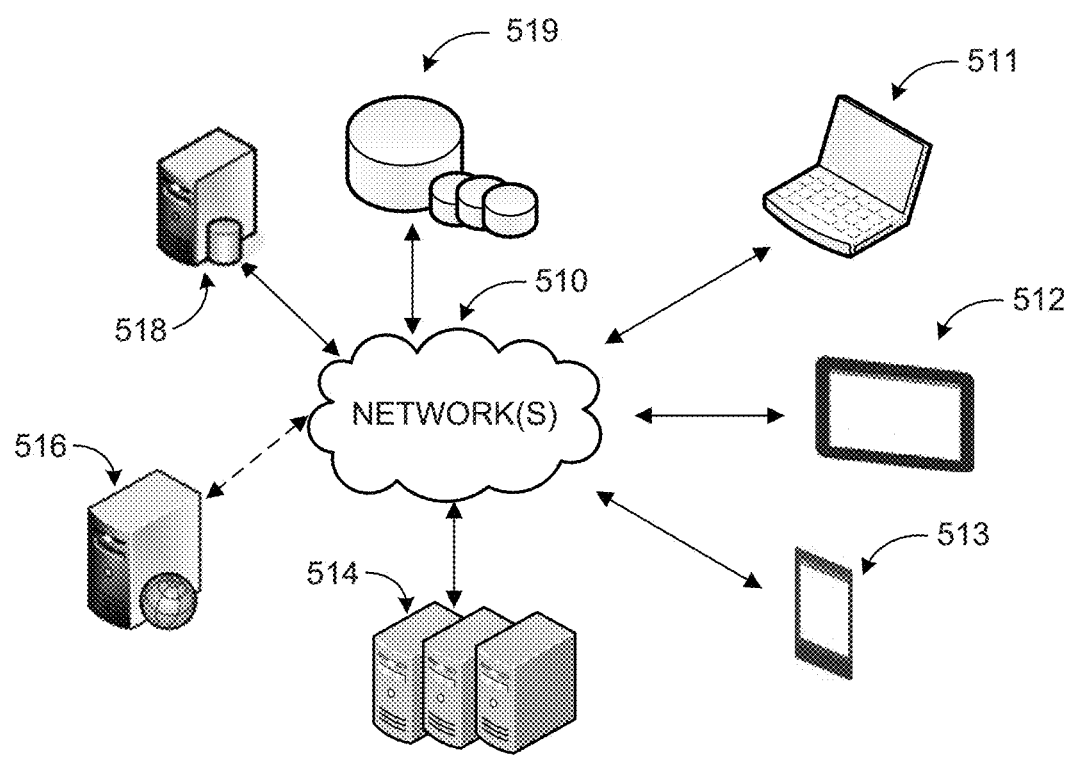
FIG. 5 is a simplified networked environment, where a system according to embodiments may be implemented.

FIG. 5 is an example networked environment, where embodiments may be implemented. An app store configured to provide apps and items associated with apps using an app map may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. The app store may present available apps and items in response to user queries ranking them based on functionality, keywords, etc. The app store may store data associated with the apps and items (including app maps) in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide an app store service with mapped items. Furthermore, the networked environments discussed in FIG. 5 are for illustration purposes only. Embodiments are not limited to the example applications, modules, or processes.

Figure 6:
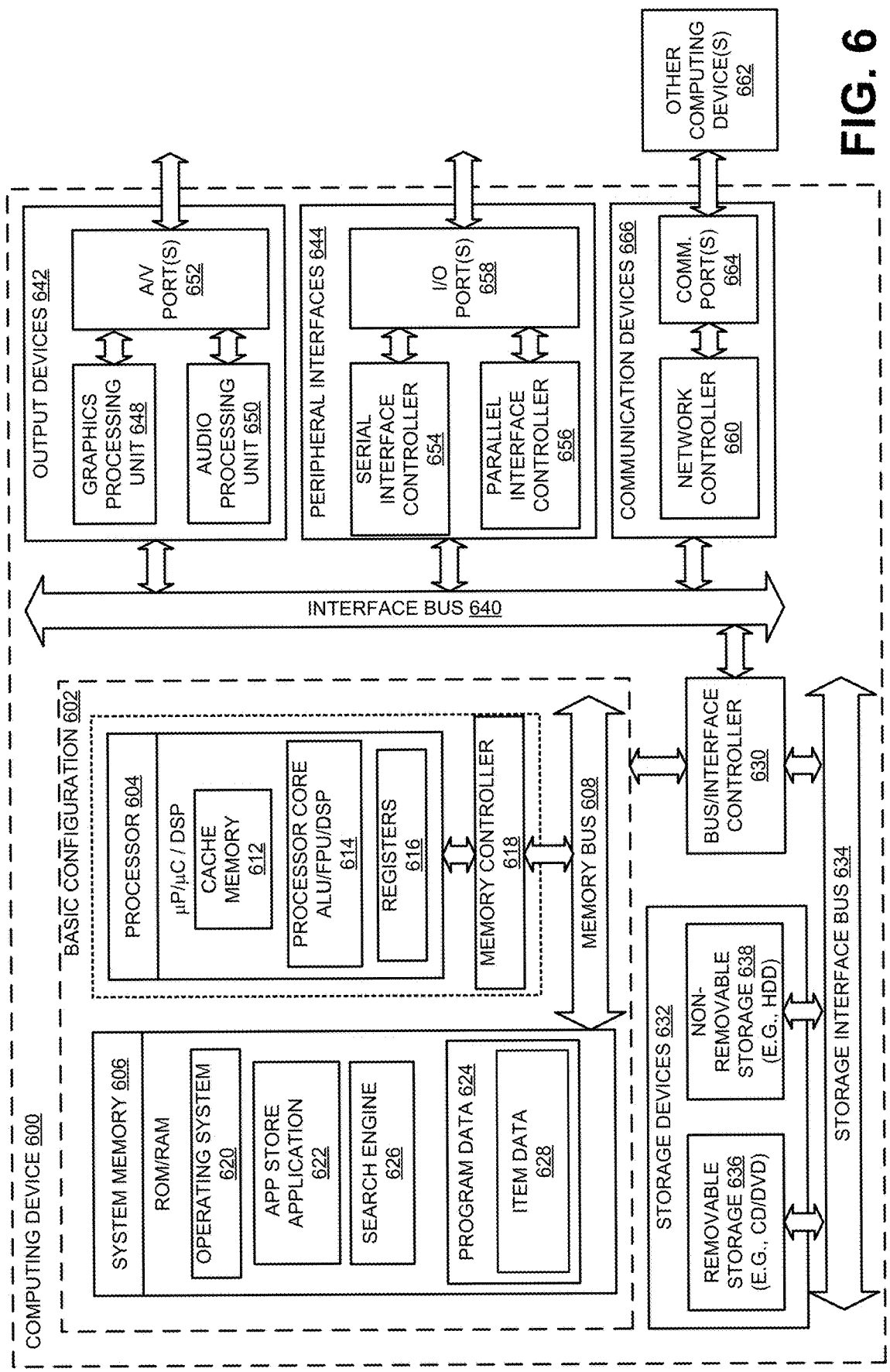
FIG. 6 illustrates a general purpose computing device, which may be configured to provide a app store and/or search services for apps with item mapping.

FIG. 6 illustrates a general purpose computing device, which may be configured to provide an app store presenting apps and associated items, arranged in accordance with at least some embodiments described herein.

For example, the computing device 600 may be used to host an app store service. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor ($\mu P$), a microcontroller ($\mu C$), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, an app store application 622, a search engine 626, and program data 624. The app store application 622 may be associated with a statically or dynamically generated list of the app's features, modes, content, and/or devices. Different descriptions, icons, titles, and the like may be shown in the app store for each of those features, modes, content, and devices. Based on the mapping and display of individual options, users may be enabled to purchase just one of those modes, features, content, and/or devices. The search engine 626 may be an independent search engine or part of the app store application 622 and execute queries for finding apps or items to suit a user's needs. The program data 624 may include, among other data, item data 628, or the like, as described herein. The item data 628 may include information associated with the items.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include a customer experience based recovery of a cloud based service. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
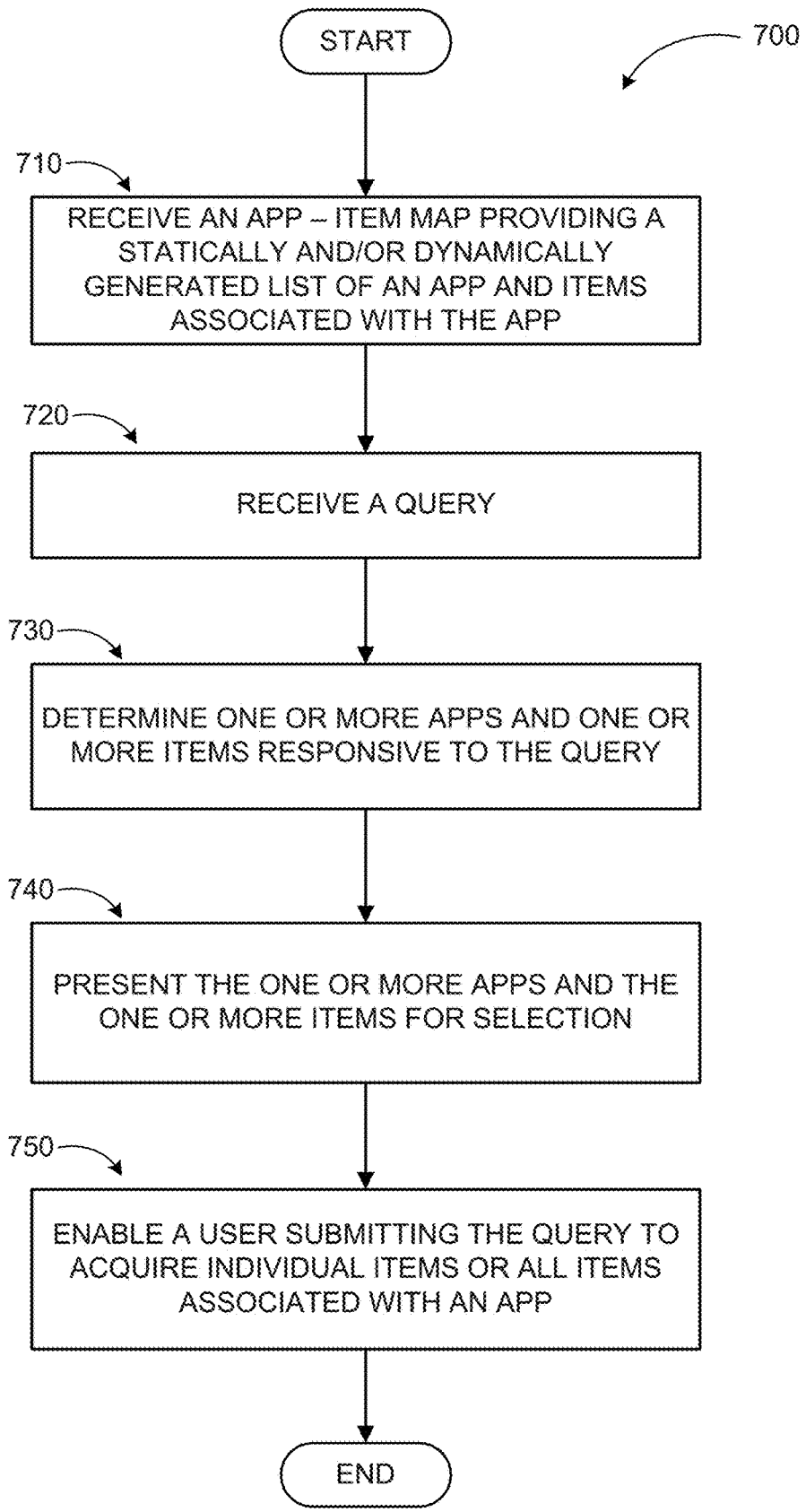
FIG. 7 illustrates a logic flow diagram for a process to provide item maps for app store apps, according to embodiments.

FIG. 7 illustrates a logic flow diagram for a process to provide item maps for app store apps, according to embodiments. Process 700 may be implemented on a server hosting a cloud based app store service, for example.

Process 700 begins with operation 710, where an app—item map providing a statically and/or dynamically generated list of an app and items associated with the app may be received at the app store. Each item may include one or more of a feature, a mode, a content, and a device of each item's associated app. The app—item map may also be generated by the app store based on descriptions provided by a developer.

At operation 720, a query may be received. In response to the query, one or more apps and one or more items may be determined at operation 730. The items may be determined based on information included in the app—item map(s). At operation 740, the one or more apps and the one or more items may be presented for selection. At operation 750, a user submitting the query may be enabled to acquire individual items or all items associated with an app.

The operations included in process 700 are for illustration purposes. An app store according to embodiments may be implemented by similar processes with fewer or additional steps, as well as in different order of operations using the principles described herein.

According to some examples, a method executed on a computing device to provide apps and items associated with apps through an app store is described. The method may include receiving an app—item map providing a statically and/or dynamically generated list of an app and items associated with the app; receiving a query; and determining one or more apps and one or more items responsive to the query, where the one or more items are determined based on information provided by the app—item map. The method may also include presenting the one or more apps and the one or more items for selection.

According to other examples, the method may further include enabling a user submitting the query to acquire individual items or all items associated with an app. Receiving the app—item map may include one or more of receiving the app—item map from a developer in form of a structured data file; receiving a link to an app—item map web service; and deriving the app—item map automatically from capabilities of the app. Deriving the app—item map automatically may include one or more of deriving the capabilities from descriptions in in-app purchasable entities and processing a single description submitted by the developer to be converted into multiple descriptions.

According to further examples, the method may further include for each item associated with the app, receiving metadata comprising one or more of: an item identifier, a title, an item icon, a rank, an item price, what the item applies to, an audience targeting information, a device targeting information, a description, and one or more keywords. The method may also include upon receiving a user selection associated with an item, presenting the metadata associated with the item, where inclusion of parent app information in the metadata is configurable based on developer input.

According to yet other examples, the method may include presenting the one or more items without indicating associated apps; for each presented app and/or presenting a list of available items associated with the presented app. Each item may include one or more of a feature, a mode, a target device, and a content of each item's associated app.

According to other examples, a computing device to provide apps and items associated with apps through an app store is described. The computing device may include a memory device configured to store instructions and a processor coupled to the memory device, the processor executing an app store application in conjunction with the instructions stored in the memory device. The app store application may be configured to receive an app—item map providing a statically and/or dynamically generated list of an app and items associated with the app, where each item includes one or more of a feature, a mode, a content, and a target device of each item's associated app; receive a query; and determine one or more apps and one or more items responsive to the query, where the one or more items are determined based on information provided by the app—item map. The app store application may be further configured to present the one or more apps and the one or more items for selection and enable a user submitting the query to acquire individual items or all items associated with an app.

According to some examples, the app store application may be further configured to enable launching of an app or an item acquired by the user the in a customized manner based on the user's preferences to provide the user a tailored experience. The customized launching of the app or the item may be enabled based on an item identifier parameter passed to the app store application by a licensing system. The app store application may also be configured to preserve a customization setting associated with selected items by the user for customization of future app or item acquisitions.

According to yet other examples, the app store application may be further configured to enable setting of licensing at one or more of a group of items level, an app level, and an item level; enable submission and publication of reviews at one of app level and item level; and/or if items associated with an app are priced individually, setting licensing and review submissions at item level as default.

According to further examples, a computer-readable memory device with instructions stored thereon to provide apps and items associated with apps through an app store is described. The instructions may include receiving an app—item map providing a statically and/or dynamically generated list of an app and items associated with the app, where each item includes one or more of a feature, a mode, a content, and a target device of each item's associated app; receiving a query; determining one or more apps and one or more items responsive to the query, where the one or more items are determined based on information provided by the app—item map; presenting the one or more apps and the one or more items for selection; and enabling a user submitting the query to acquire individual items or all items associated with an app.

According to some examples, the instructions may further include implementing one or more control mechanisms to prevent spamming, the control mechanisms including: preventing developers form submitting more than a preset number of items for each app, limiting a number of items associated with an app on a query result. The instructions may also include enabling users to see related items for a displayed item and enabling the developer to specify a per-item relative rank for the query result. The instructions may further include influencing which subset of items associated with the app are to be presented based on one or more of employing a rank-specification function for new apps and items, using click-through data for existing apps and items, and a developer provided audience targeting specification.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide apps through an app store, the method comprising:
    receiving a query from a user for an app in the app store via a computer network, the app store containing multiple apps individually having an app-item map that identifies an app and one or more features, modes, or content items associated with the corresponding app;
    in response to the received query,
        determining one or more of the features, modes, or content items of the apps that are relevant to and based on the received query;
        presenting the determined one or more features, modes, or content items for selection by the user;
        receiving a user selection of one of the presented one or more features, modes, or content items; and
    in response to the received user selection of the one of the presented features, modes, or content items,
        determining an item identifier corresponding to the one of the presented features, modes, or content items;
        customizing a corresponding one of the multiple apps associated with the selected one of the presented one or more features, modes, or content items for a particular user experience by:
            activating the corresponding one of the multiple apps by passing the determined item identifier as a parameter to the corresponding one of the multiple apps; and
            saving the activated one of the multiple apps as a customized app for the particular user experience; and
        providing the customized app for the particular user experience to the user via the computer network, wherein upon execution of the customized app,
        a selected mode for the customized app is enabled as a default mode in accordance with the item identifier;
        a user interface of the customized app is tailored to accommodate a selected feature in accordance with the item identifier; or
        a selected content item is configured as a default content item for the customized app in accordance with the item identifier.

2. The method of claim 1, further comprising:
    enabling the user submitting the query to acquire the individual one or more features, modes, or content items or all of the one or more features, modes, or content items associated with the app.

3. The method of claim 1 wherein:
    the app-item map is in a form of a structured data file; and
    the method further includes:
        receiving a link to a web service; and
        deriving the app-item map by following the link to the web service.

4. The method of claim 3 wherein deriving the app-item map comprises one or more of:
    deriving the app-item map from descriptions in in-app purchasable entities; or
    converting a single description of the app to multiple descriptions.

5. The method of claim 1 wherein:
    each of the features, modes, or content items associated with the app includes metadata containing an item identifier, a title, an item icon, a rank, an item price, what the item applies to, the audience targeting information, a device targeting information, a description, or one or more keywords.

6. The method of claim 5, further comprising:
    upon receiving the user selection, presenting the metadata associated with the selected features, modes, or content items to the user.

7. The method of claim 1 wherein presenting the determined one or more apps includes:
    presenting the one or more features, modes, or content items without indicating associated apps.

8. The method of claim 1 wherein presenting the determined one or more apps includes:
    presenting a list of available features, modes, or content items associated with the individual presented one or more apps.

9. A computing device to provide apps through an app store, the computing device comprising:
    a processor; and
    a memory containing instructions executable by the processor to cause the processor to perform a process including:
        receiving, via a computer network, a query from a user for an app in the app store, the app store containing multiple apps individually having an app-item map containing a list of one or more features or modes of operation of a corresponding app;

in response to the received query, determining one or more features or modes of operation that are relevant to and based on the received query;

presenting the determined one or more features or modes of operation for selection by the user;

receiving a user input selecting a feature or a mode of operation from the presented one or more features or modes of operation, the selected feature or mode of operation being associated with one of the apps in the app store; and in response to the received user input selecting the feature or mode of operation, determining an item identifier corresponding to the selected feature or mode of operation;

customizing, based on the selected feature or mode of operation, the app in the app store associated with the selected feature or mode of operation for a particular user experience by activating the corresponding one of the multiple apps via passing the determined item identifier as a parameter to the corresponding one of the multiple apps for:

enabling the selected mode of operation as a default mode for the app during execution of the app; or tailoring a user interface of the app to provide the selected feature in the app during execution; and saving the activated one of the multiple apps with the enabled mode of operation or tailored user interface as a customized app for the particular user experience; and providing the saved customized app to the user via the computer network.

10. The computing device of claim 9 wherein the process performed by the processor further comprises:

enabling the user submitting the query to acquire the individual one or more features or modes of operation or all of the one or more features or modes of operation associated with the app.

11. The computing device of claim 9 wherein:

the app-item map is in a form of a structured data file; and the process performed by the processor further comprises:

receiving a link to a web service; and deriving the app-item map by following the link to the web service via the computer network.

12. The computing device of claim 11 wherein the process performed by the processor further comprises deriving the app-item map by:

deriving the app-item map based on descriptions in in-app purchasable entities; or converting a single description of the app to multiple descriptions.

13. The computing device of claim 9 wherein:

each of the features or modes of operations associated with the app includes metadata containing an item identifier, a title, an item icon, a rank, an item price, what the item applies to, the audience targeting information, a device targeting information, a description, or one or more keywords.

14. The computing device of claim 13, further comprising:

upon receiving the user selection, presenting the metadata associated with the selected feature or the mode of operation to the user.

15. The computing device of claim 9 wherein presenting the determined the one or more features or modes of operation includes:

presenting the one or more items without indicating associated apps.

16. The computing device of claim 9 wherein presenting the determined one or more features or modes of operation includes:

presenting the one or more features or modes of operation individually with an associated app; and presenting a list of available features or modes of operation associated with the individual apps without indicating associated apps in the app store.

17. A method executed on a computing device to provide apps through an app store, the method comprising:

receiving, via a computer network, a query from a user for an app in the app store, the app store containing multiple apps individually having an associated list of one or more features or modes of operation of a corresponding app;

in response to the received query, searching the app store based on the received query to determine a list of features or modes of operation that are relevant to the received query;

presenting, via the computer network, the determined listed of features or modes of operation to the user for selection by the user;

receiving, via the computer network, a user input selecting one of the feature or mode of operation in the presented list, the selected feature or mode of operation being associated with one of the apps in the app store; and in response to the received user input selecting the feature or mode of operation, determining an item identifier corresponding to the one of the presented features, modes, or content items;

customizing a corresponding one of the multiple apps associated with the selected one of the presented one or more features or modes of operation by passing the determined item identifier as a parameter to the corresponding one of the multiple apps, wherein the customizing includes configuring, based on the selected feature or mode of operation, the one of the apps in the app store associated with the selected feature or mode of operation for a particular user experience by:

enabling the selected mode of operation as a default mode for the app during execution of the app; or tailoring a user interface of the app to provide the selected feature in the app during execution; and saving the one of the apps with the enabled mode of operation or tailored user interface as a customized app for the particular user experience; and providing the saved customized app to the user via the computer network.

18. The method of claim 17 wherein:

the selected feature or mode of operation includes an item identifier; and configuring, based on the selected feature or mode of operation, the one of the apps in the app store includes passing the item identifier as a parameter to the app, the passed item identifier usable by the app to enable the selected mode of operation as a default mode for the app or to tailor a user interface of the app to provide the selected feature in the app during execution.

19. The computing device of claim 17 wherein presenting the determined one the one or more features or modes of operation includes:
 presenting the one or more features or modes of operation without indicating associated apps in the app store.

20. The computing device of claim 17 wherein presenting one or more features or modes of operation for selection by the user includes:
 presenting the one or more features or modes of operation individually with an associated app in the app store; or
 presenting a list of available features or modes of operation associated with the individual apps without indicating associated apps in the app store.

* * * * *